(12) United States Patent
Park

(10) Patent No.: US 9,921,580 B2
(45) Date of Patent: Mar. 20, 2018

(54) APPARATUS FOR SWITCHING DRIVING MODES OF VEHICLE AND METHOD OF SWITCHING BETWEEN MODES OF VEHICLE

(71) Applicant: LG ELECTRONICS INC., Seoul (KR)

(72) Inventor: Hyungmin Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/220,629

(22) Filed: Jul. 27, 2016

(65) Prior Publication Data
US 2016/0334788 A1   Nov. 17, 2016

Related U.S. Application Data

(63) Continuation of application No. 14/713,710, filed on May 15, 2015, now Pat. No. 9,442,484.

(30) Foreign Application Priority Data

Dec. 22, 2014 (KR) ........................ 10-2014-0186253

(51) Int. Cl.
*G05D 1/00* (2006.01)
*B60W 30/182* (2012.01)
(Continued)

(52) U.S. Cl.
CPC ........... *G05D 1/0061* (2013.01); *B60W 30/12* (2013.01); *B60W 30/143* (2013.01);
(Continued)

(58) Field of Classification Search
CPC ...... B60W 10/11; B60W 50/10; B60W 10/06; B60W 50/04; B60W 30/182;
(Continued)

(56) References Cited

U.S. PATENT DOCUMENTS 7,706,953 B1    4/2010  Sun
8,515,631 B2 *  8/2013  Murata ............... F16H 61/0213
                                                        701/52

(Continued)

FOREIGN PATENT DOCUMENTS

CN    103010213 A    4/2013
DE    101 44 797 A1  3/2003
(Continued)

*Primary Examiner* — Behrang Badii
(74) *Attorney, Agent, or Firm* — Birch, Stewart, Kolasch & Birch, LLP

(57) ABSTRACT

An apparatus for switching between driving modes of a vehicle with an automatic driving system, including: an input unit for receiving an input to switch from automatic driving mode to manual driving mode; a speed sensor for determining a current speed of the vehicle; a display unit on which a first indicator indicating a current speed of the vehicle when the vehicle is in an automatic driving mode is displayed; a pedal sensor for determining a current displacement distance of an accelerator pedal; a controller for determining a virtual speed according to the current distance displacement of the accelerator pedal when an input is received that requests switching of the automatic driving mode of the vehicle to a manual driving mode if the vehicle is in the automatic driving mode and displays a second indicator indicating the virtual speed on the display unit, and for switching the automatic driving mode to the manual driving mode when the virtual driving speed is similar to the current speed of the vehicle.

5 Claims, 9 Drawing Sheets

(51) Int. Cl.
*B60W 50/10* (2012.01)
*B60W 30/12* (2006.01)
*B60W 30/14* (2006.01)
*B60W 40/09* (2012.01)
*B62D 15/02* (2006.01)
*G06F 19/00* (2018.01)
*B60W 10/11* (2012.01)
*F16H 61/02* (2006.01)
*B60W 10/115* (2012.01)
*B60W 10/06* (2006.01)
*B60W 50/00* (2006.01)
*B60W 50/14* (2012.01)

(52) U.S. Cl.
CPC .......... *B60W 30/182* (2013.01); *B60W 40/09* (2013.01); *B60W 50/10* (2013.01); *B62D 15/021* (2013.01); *G05D 1/0088* (2013.01); *B60K 2310/22* (2013.01); *B60K 2310/246* (2013.01); *B60W 10/06* (2013.01); *B60W 10/11* (2013.01); *B60W 10/115* (2013.01); *B60W 2050/0096* (2013.01); *B60W 2050/146* (2013.01); *B60W 2510/18* (2013.01); *B60W 2520/10* (2013.01); *B60W 2540/00* (2013.01); *B60W 2540/10* (2013.01); *B60W 2540/18* (2013.01); *B60W 2900/00* (2013.01); *F16H 61/0213* (2013.01); *G06F 19/00* (2013.01)

(58) Field of Classification Search
CPC .. B60W 50/045; B60W 50/14; B60W 50/085; B60W 50/082; B60W 10/115; B60W 30/1882; B60W 50/06; G05D 1/0061; G05D 1/0238; G05D 1/0272; G05D 1/0265; F16H 1/0213; F16H 61/0213
See application file for complete search history.

(56) References Cited

U.S. PATENT DOCUMENTS

| | | | | |
|---|---|---|---|---|
| 8,560,188 | B2* | 10/2013 | Ishikawa | B60W 10/11 |
| | | | | 192/3.29 |
| 8,825,258 | B2 | 9/2014 | Cullinane et al. | |
| 2010/0318267 | A1* | 12/2010 | Murata | F16H 61/0213 |
| | | | | 701/52 |
| 2013/0013161 | A1* | 1/2013 | Otsubo | B60W 10/06 |
| | | | | 701/52 |
| 2013/0179044 | A1* | 7/2013 | Ishikawa | B60W 10/11 |
| | | | | 701/53 |
| 2016/0347328 | A1* | 12/2016 | Takehara | B60W 50/10 |

FOREIGN PATENT DOCUMENTS

| | | |
|---|---|---|
| EP | 1 683 675 A1 | 7/2006 |
| JP | 2007-196809 A | 8/2007 |
| JP | 2014-181020 A | 9/2014 |
| KR | 10-1470190 B1 | 12/2014 |

\* cited by examiner

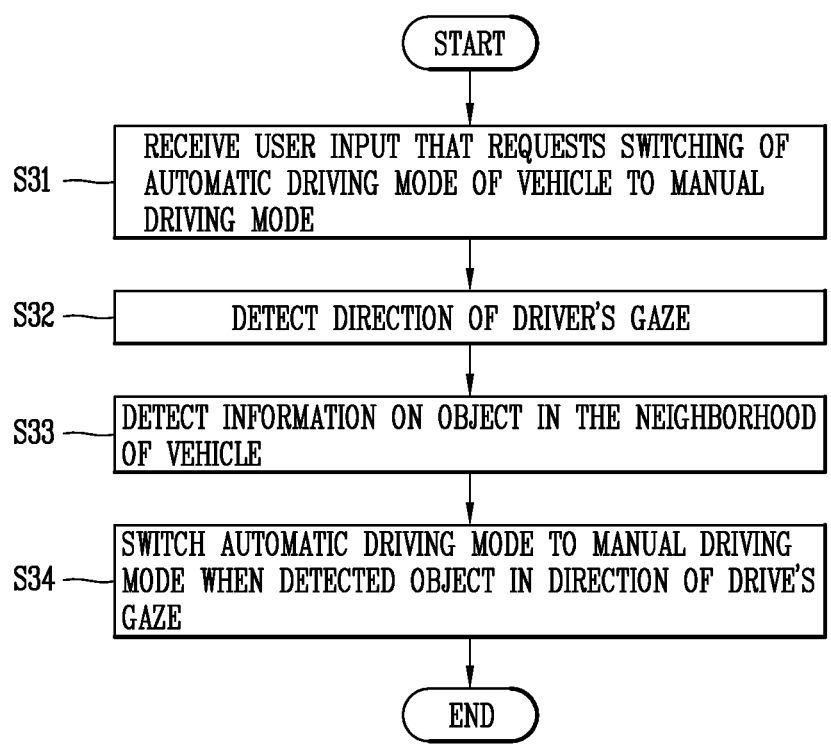

APPARATUS FOR SWITCHING DRIVING MODES OF VEHICLE AND METHOD OF SWITCHING BETWEEN MODES OF VEHICLE

CROSS-REFERENCE TO RELATED APPLICATION

This application is a Continuation of copending U.S. application Ser. No. 14/713,710, filed on May 15, 2015, which claims priority under 35 U.S.C. § 119(a) to Application No. 10-2014-0186253, filed in the Republic of Korea on Dec. 22, 2014, all of which are hereby expressly incorporated by reference into the present application.

BACKGROUND OF THE DISCLOSURE

Field of the Disclosure

The present disclosure relates to an apparatus for switching driving modes of a vehicle and a method of switching between the driving modes of the vehicle.

Background of the Disclosure

Generally, an automatic driving vehicle recognizes road conditions, such as neighboring vehicles, pedestrians, obstacles, lanes, traffic signals, and, based on recognized road conditions, enables a vehicle to automatically drive in an automatic driving mode through an advanced driving assist system (ADAS). Otherwise, the vehicle can be driven manually in a manual driving mode.

SUMMARY OF THE DISCLOSURE

To achieve these and other advantages and in accordance with the purpose of this specification, as embodied and broadly described herein, there is provided an apparatus for switching between driving modes of a vehicle that is capable of automatic driving and manual driving, the apparatus including: an input unit; a display unit on which a first indicator indicating a current speed of the vehicle when the vehicle is in an automatic driving mode is displayed; and a controller that detects a virtual speed according to a distance that a pedal of an accelerator of the vehicle moves when an input is received that requests switching of the automatic driving mode of the vehicle to a manual driving mode if the vehicle is in the automatic driving mode, displays a second indicator indicating the detected virtual speed on the display unit, and switches the automatic driving mode to the manual driving mode when the virtual driving speed is the same as or similar to the current speed.

In the apparatus, when it is determined that the virtual speed is the same as or similar to the current speed, the controller may determine whether or not the virtual speed is maintained to be the same as or similar to the current speed for a pre-set reference time, and when it is determined that the virtual speed is being maintained as the same or similar to the current speed for the pre-set reference time, the controller may switch the automatic driving mode to the manual driving mode.

In the apparatus, when it is determined that the virtual speed is the same as or similar to the current speed, the controller may display a pre-set time that will elapse before the automatic driving mode is switched to the manual driving mode on the display unit, and when the displayed pre-set time is counted down and the pre-set time elapses, the controller may switch the automatic driving mode to the manual driving mode.

In the apparatus, when the vehicle is in the automatic driving mode, the controller may display a third indicator indicating a current steering angle of the vehicle on the display unit.

In the apparatus, the controller may detect a virtual steering angle corresponding to a revolution of a steering wheel of the vehicle when the input is received, and may display a fourth indicator indicating the detected virtual steering angle on the display unit.

In the apparatus, the controller may determine whether or not the virtual steering angle is the same as or similar to the current steering angle, and when it is determined that the virtual steering angle is the same as or similar to the current steering angle, the controller may switch the automatic driving mode to the manual driving mode.

In the apparatus, when it is determined that the virtual steering angle is the same as or similar to the current steering angle, the controller may determine whether or not the virtual steering angle is maintained so as to be the same as or similar to the current steering angle for a pre-set reference time, and when it is determined that the virtual steering angle is being maintained as the same or similar to the current steering angle for the pre-set reference time, the controller may switched the automatic driving mode to the manual driving mode.

In the apparatus, when it is determined that the virtual steering angle is the same as or similar to the current steering angle, the controller may display a pre-set time that will elapse before the automatic driving mode is switched to the manual driving mode on the display unit, and when the displayed pre-set time is counted down and the pre-set time elapses, the controller may switch the automatic driving mode to the manual driving mode.

In the apparatus, when the input is received, the controller may determine whether an object recognized by an advanced driving assist system (ADAS) is in a direction of a driver's gaze, which is recognized by a driver state monitoring (DSM) system, and when it is determined that the object is in the direction of the user's gaze, the controller may switch the automatic driving mode to the manual driving mode.

In the apparatus, the controller may detect a virtual steering angle corresponding to a revolution of a steering wheel of the vehicle when the input is received, and may determine whether or not the virtual steering angle is the same or similar to a current steering angle of the vehicle, and when it is determined that the virtual steering angle is the same or similar to the current steering angle, the virtual speed is the same or similar to the current speed, and the object is in the direction of the driver's gaze, the controller may switch the automatic driving mode to the manual driving mode.

To achieve these and other advantages and in accordance with the purpose of this specification, as embodied and broadly described herein, there is provided a method of switching between driving modes of a vehicle, for use in a vehicle that is capable of automatic driving and manual driving, the method including: an input unit; displaying a first indicator indicating a current speed of the vehicle on a display unit when the vehicle is in an automatic driving mode; detecting a virtual speed according to a distance that a pedal of an accelerator of the vehicle moves when an input that requests switching of the automatic driving mode of the vehicle to a manual driving mode is received through an input unit, if the vehicle is in the automatic driving mode; displaying a second indicator indicating the detected virtual speed on the display unit; and switching the automatic driving mode to the manual driving mode when the virtual driving speed is the same as or similar to the current speed.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

FIG. 8 is a flowchart illustrating a method of switching between the driving modes of the vehicle according to another embodiment of the present invention.

DETAILED DESCRIPTION OF THE DISCLOSURE

Unless differently defined, all the terms used herein with including technical or scientific terms have the same meaning as terms generally understood by those skilled in the art relating to the field of the present invention. Terms defined in a general dictionary should be understood so as to have the same meanings as contextual meanings of the related art. Unless definitely defined in the present invention, the terms are not interpreted as ideal or excessively formal meanings. Furthermore, when the technical terms used in the present invention are unsuitable technical terms that do not precisely express the techniques of the present invention, the unsuitable technical terms should be replaced by suitable technical terms that can be understood by those skilled in the art. The general terms used in the present invention should be interpreted based on the previous or next contexts, but should not be interpreted as an excessively narrowed meaning.

A singular expression includes a plural concept unless there is a contextually distinctive difference therebetween. In embodiments of the present invention, a term of "include" or "have" should not be interpreted as if it absolutely includes a plurality of components or steps of the specification. Rather, the term of "include" or "have" may not include some components or some steps, or may further include additional components.

It will be understood that although the terms first, second, etc. may be used herein to describe various elements, these elements should not be limited by these terms. These terms are generally only used to distinguish one element from another. For instance, a first component may be referred to as a second component, and a second component may be also referred to as a first component within the scope of the present invention.

Description will now be given in detail of the exemplary embodiments, with reference to the accompanying drawings. For the sake of brief description with reference to the drawings, the same or equivalent components will be provided with the same reference numbers, and description thereof will not be repeated.

In describing embodiments of the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings.

Figure 1:
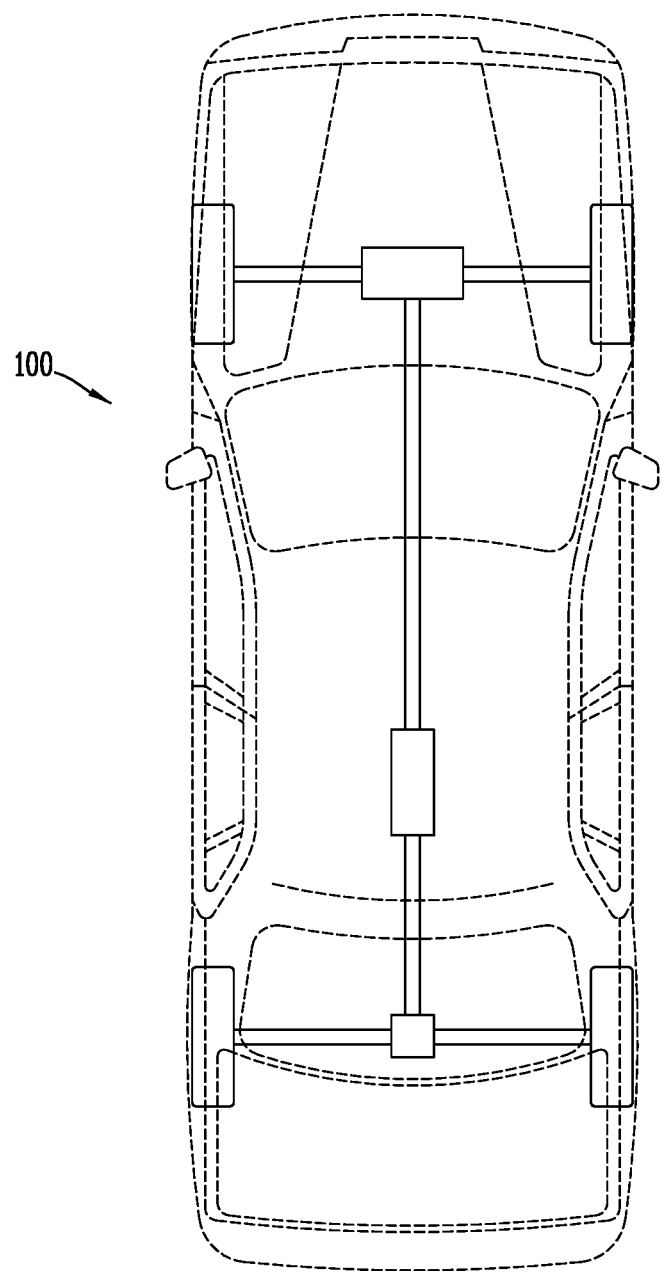
FIG. 1 is a diagram illustrating a vehicle to describe an apparatus for switching between driving modes of the vehicle and a method of switching between the driving modes of the vehicle according to an embodiment of the present invention.

FIG. 1 is a diagram illustrating a vehicle (for example, an electric vehicle) to describe an apparatus for switching between vehicle driving modes and a method of switching between the vehicle driving modes according to an embodiment of the present invention. The apparatus and the method according to an embodiment of the present invention can be applied not only to a general vehicle (for example, a gasoline-fueled vehicle, diesel-fueled vehicle, a gas-fueled vehicle and the like), but also to an electric-only vehicle, a hybrid electric vehicle, and the like. The hybrid electric vehicle (HEV) is equipped with a battery pack, including multiple battery cells, to provide power for the vehicle. It is necessary to make voltages of the multiple battery cells, included in the battery pack, uniform, to ensure safety from the battery pack, increase a life span of the battery pack, and obtain a high output from the battery pack.

Figure 2:
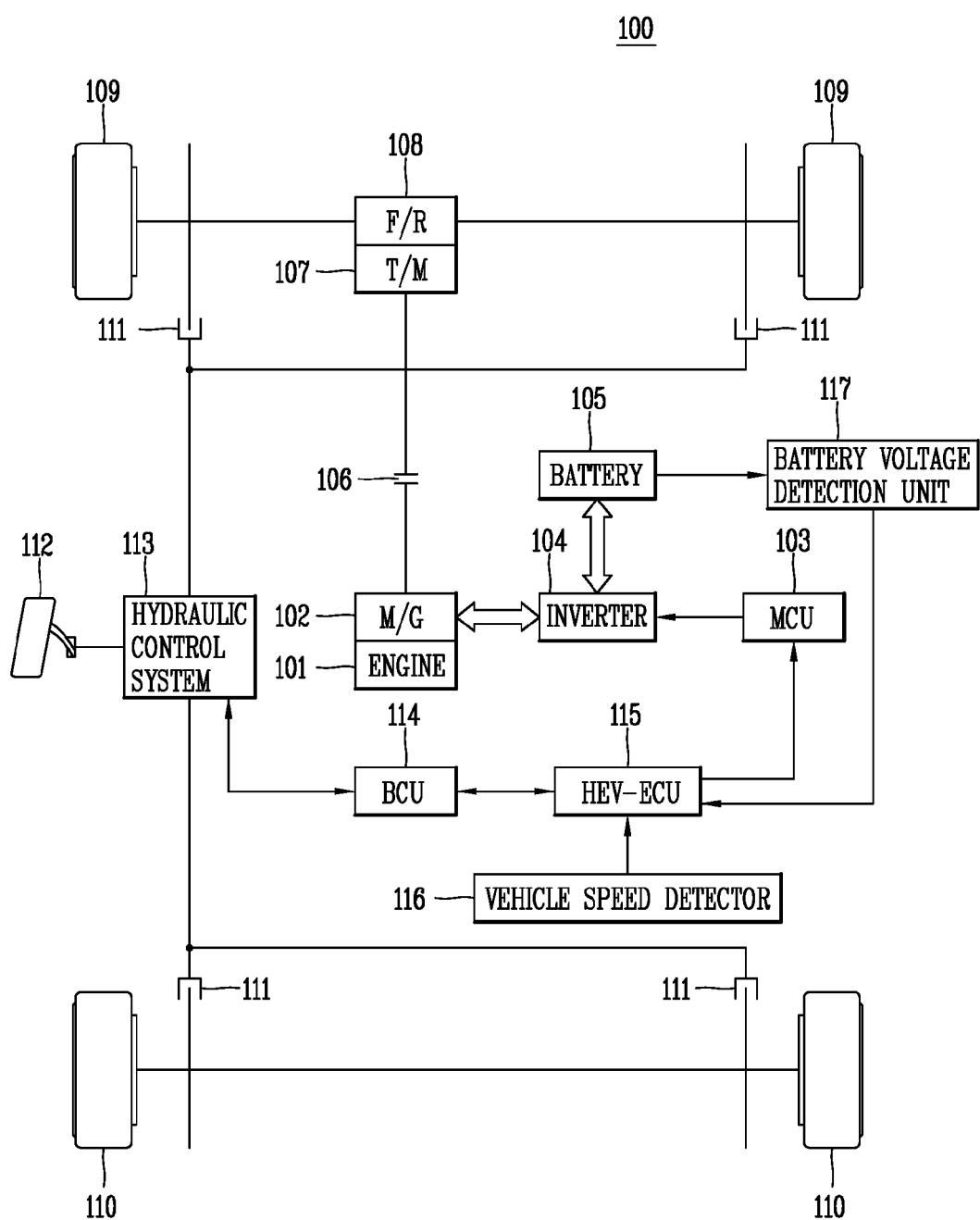
FIG. 2 is a diagram illustrating a configuration of the vehicle to describe the apparatus and the method according to an embodiment of the present invention.

FIG. 2 is a diagram illustrating a configuration of the vehicle (for example, a hybrid electric vehicle) to describe an apparatus and a method according to an embodiment of the present invention. As illustrated in FIG. 2, a vehicle necessary for describing the apparatus and the method according to an embodiment of the present invention includes an engine 101, as a power source, and a motor/generator unit (hereafter referred to as the "M/G unit" for short) 102. In the case of a front-wheel drive vehicle, wheels that are driven by the power source are the front wheels. In the case of a rear-wheel drive vehicle, the wheels that are driven by the power source are the rear wheels. However, the front-wheel vehicle will be described in the exemplary embodiments below. Applying the apparatus and the method according to the embodiment of the invention to the rear-wheel drive vehicle is same as from a description of the front-wheel drive vehicle, which will be provided below, except the rear wheels are the drive wheels instead of the front wheels.

The M/G unit 102 is an apparatus that selectively functions as a motor or as a generator according to a driving state, and is apparent to a person of ordinary skill in the related art. Because the M/G unit 102 is of a configuration to be a motor or a generator, it is referred to as the M/G unit. In addition to the M/G unit 102, the vehicle 100 can include an engine 101, which is either gasoline-fueled, diesel-fueled, or gas-fueled. The engine 101 and the motor 102 are connected in series to a transmission. The M/G unit 102 is operated as a motor by a signal from an inverter 104 under the control of a motor control unit (MCU) 103. That is, the inverter 104 drives the M/G unit 102 to be the power source for the vehicle using electric energy stored in the battery 105 under the control of the MCU 103. In the case where the M/G unit 102 is operated as a generator under the control of the MCU 103, the battery 105 is charged through the inverter 104 with electric energy generated by the M/G unit 102.

Power from the engine 101 or the M/G unit 103 is transferred to a transmission (T/M) 107 through a clutch 106, and then is transferred onto the front wheels 109 through a final drive gear (F/R) 108. Rear wheels 110 are non-drive wheels that are not driven by the engine 101 or the M/G unit 102.

A wheel brake apparatus 111 for reducing the number of revolutions of each wheel or slowing down each wheel is installed in each of the front wheels 109 and the rear wheels 110. A brake pedal 112 and a hydraulic control system 113 are included to actuate each of the wheel brake apparatus 111. The hydraulic control system 113 hydraulically brakes each of the wheel brake apparatus 111 based on hydraulic pressure that is generated according to operation of the brake pedal 112. The electric vehicle controls the hydraulic control system 113 and includes a brake control unit (BCU) that receives information on a brake control state from the hydraulic control system 113.

The BCU 114 detects the hydraulic pressure that is generated in the hydraulic control system 113 when a driver operates the brake pedal 112. Based on the result of the detection, the BCU 114 calculates braking power applied to the drive wheels (for example, the front wheels 109), that is, hydraulic pressure braking power provided by hydraulic pressure and regenerative braking power to be provided by a generator operation in the M/G unit 102. Accordingly, the BCU 114 supplies the calculated hydraulic pressure braking power to the wheel brake apparatus 111 of the front wheels 109 under the control of the hydraulic control system 113.

The electric vehicle includes a hybrid electric vehicle electronic control unit (HEV-ECU) 115 that communicates with the BCU 114 and the MCU 103 in order to control them and thus realizes an electric vehicle that performs a method for limiting to a maximum speed.

The regenerative braking power calculated by the BCU 114 is transferred to the HEV-ECU 115, so that the HEV-ECU 115 controls the MCU 103 based on the received regenerative braking power. Accordingly, the MCU 103 can operate the M/G unit 102 as a generator to produce the regenerative braking power designated by the HEV-ECU 115. At this time, the electric energy generated by the M/G unit 102 is stored in the battery 105.

The electric vehicle further includes a vehicle speed detector 116 that detects a vehicle speed. The HEV-ECU 115 utilizes the vehicle speed detected by the vehicle speed detector 116 as data for controlling the BCU 114 and the MCU 103.

In addition, the electric vehicle includes a battery voltage detection unit 117 that detects a voltage of the battery 105. The battery voltage detection unit 117 detects a current voltage of the battery 105. The battery voltage detection unit 117 provides the resulting data in such a manner that the HEV-ECU 115 limits a maximum speed of the electric vehicle according to a deviation of the detected current voltage from a predetermined reference voltage.

A configuration of a telematics terminal 200 necessary for the apparatus and the method according to the embodiment of the present invention will be described below referring to FIG. 3.

Figure 3:
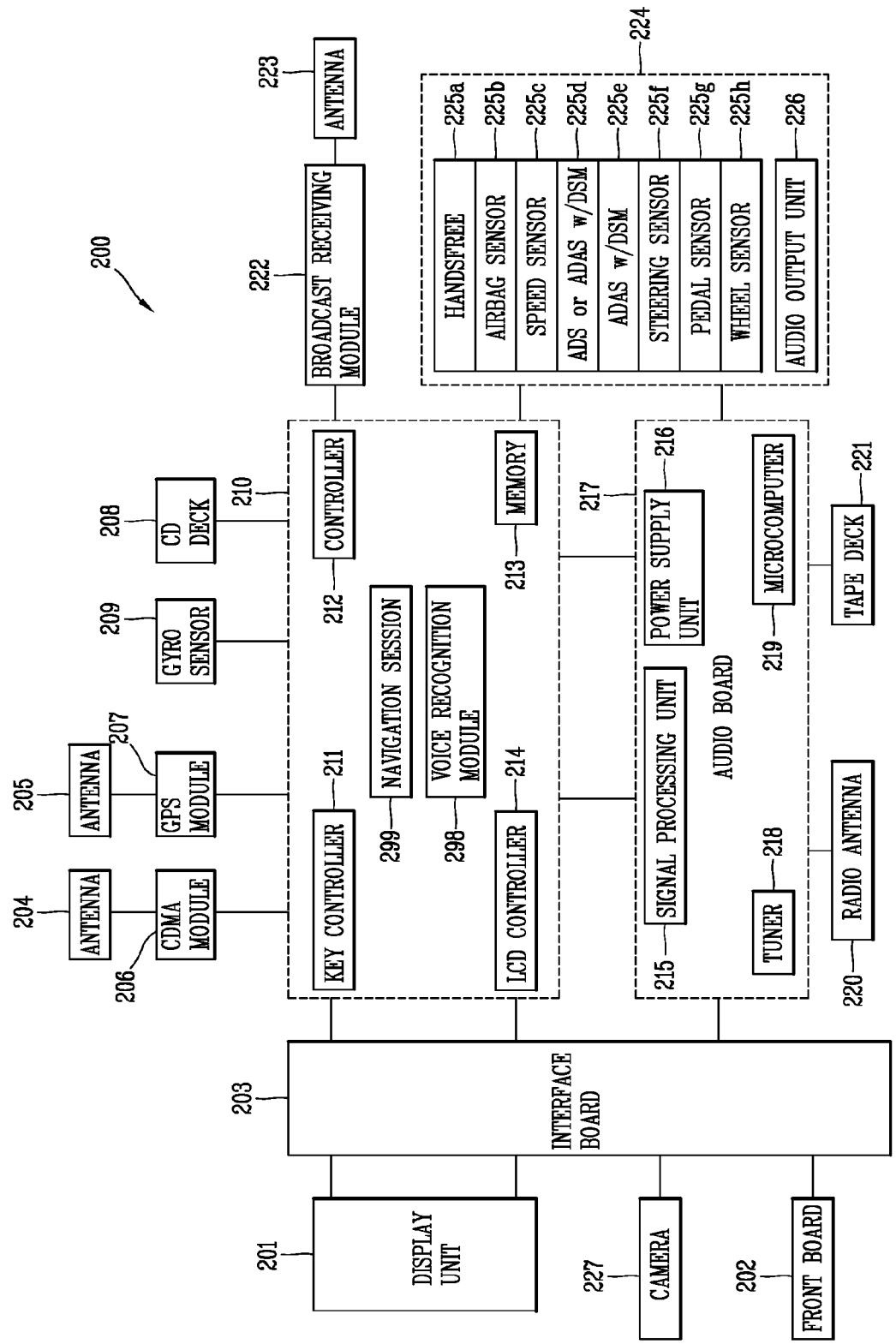
FIG. 3 is a block diagram illustrating a configuration of a telematics terminal to describe the apparatus and the method according to an embodiment of the present invention.

FIG. 3 is a block diagram illustrating the configuration of the telematics terminal 200 to describe an apparatus and a method according to an embodiment of the present invention. As illustrated in FIG. 3, the telematics terminal 200 includes a controller (for example, a CPU) 212 that controls the entire telematics terminal 200, a memory 213 in which various pieces of information are stored, a key controller 211 that controls various key signals, and a main board 210 into which an LCD controller 214 is built for controlling a display unit 201, such as a liquid crystal display (LCD).

Map information (i.e. map data) for displaying path finding information on a digital map are stored in the memory 213. In addition, traffic information collection control algorithms for inputting traffic information according to a condition of a road along which vehicles currently drive are stored in the memory 213. Further, information for the control algorithms are stored in the memory 213.

The main board 210 can be configured to interface with a code division multiple access (CDMA) module 206 of a mobile communication terminal that is assigned its own serial number and is built into the vehicle. The main board 210 can also be configured to interface with a global positioning system (GPS) module 207 that receives the GPS signals for identifying a vehicle position, tracking a driving path from a departure point to a destination point or transmit traffic information collected by the user. In addition, the main board 210 can interface with a CD deck 208 to receive signals recorded on the compact disk (CD). A gyro sensor 209 for detecting movement and/or orientation can also interface with the main board 210. The CDMA module 206 and the GPS module 207 transmit/receive a signal to/from antennas 204 and 205, respectively. A broadcast reception module 222 can be connected to the main board 210 to receive a broadcast signal through an antenna 223. A sound recognition device (or a sound recognition module) 298 on the main board 210 can recognize a sound produced by the user and performs a corresponding function according to a signal of the recognized sound.

An LCD unit 201 is controlled by the LCD controller 214 on the main board 210 through an interface board 203. Various video signals and text signals are displayed on the display unit 201. In addition, the display unit 201 includes a proximity sensor and a touch sensor (a touch screen) in FIG. 2. That is, the display unit 201 detects proximity touch on a display window through the proximity sensor. For example, when a pointer (for example, a finger or a stylus pen) comes into proximity touch with the display unit 201, the display unit 201 detects a position of the proximity touch and outputs positional information corresponding to the detected position to the controller 212.

A front board 202 is controlled by the key controller 211 on the main board 210 through the interface board 203. Buttons for inputting various key signals are provided on the front board 202. The front board 202 provides a key signal corresponding to a button selected by the user to the main board 210. A menu key for directly inputting the traffic information is provided on the front board 202. The menu key is configured in such a manner that it is controlled by the key controller 211. A camera 227 that captures an image inside of and/or outside of a vehicle is connected to the main board 210 through the interface board 203.

An audio board 217 is connected to the main board 210 and processes various audio signals. The audio board 217 is configured to include a microcomputer 219 for controlling the audio board 217, a tuner 218 that receives a radio signal, a power supply unit 216 that supplies electric power to the microcomputer 219, and a signal processing unit 215 that processes various types of sound signals.

The audio board 217 can be configured to be connected to a radio antenna 220 for receiving a radio signal. The audio board 217 can be connected to a CD deck 221 for reproducing an audio signal recorded on a compact disc (CD). The audio board 217 may further include a sound output unit (for example, an amplifier) 226 for outputting the sound signal processed in the audio board 217.

The main board 210 has a vehicle interface 224 with components of the vehicle 100. An audio output unit (speaker) 226 can be a part of the vehicle interface 224. Both the audio board 217 and the main body 210 can be connected to the vehicle interface 224. The main board 210 can have a vehicle interface 224 with the hands-free kit 225a for controlling sound signals as well as other aspects of the vehicle. For example, the main board 210 can also have a vehicle interface 224 with the air bag sensors 225b for detecting deployment of airbags of the driver or passengers.

A speed sensor 225c for detecting a vehicle speed may also be a part of the vehicle interface 224. The speed sensor 225c calculates the vehicle speed and provides vehicle speed information to the central processing unit or controller 212. Thus, the speed sensor 225c provides the actual speed of the vehicle 100.

An automatic driving system (ADS) 225d of the related art may also be a part of the vehicle interface 224. An automatic driving system (ADS) in the related art is disclosed in U.S. Pat. No. 8,825,258, and thus, a detailed description of it is omitted. The central processing unit or controller 212 can interact with the ADS. In addition, an advanced driving assist system (ADAS), which detects objects or other physical features around or near the vehicle, can also be coupled with the central processing unit or controller 212 through the vehicle interface 224. In another addition to the ADS, the detection of the direction of a user's gaze through a driver state monitoring (DSM) system can also be coupled with the central processing unit or controller 212 through the vehicle interface 224. An advanced driving assist system (ADAS) with a driver state monitoring (DSM) system 225e is known in the related art, and thus, a detailed description of it is omitted.

A steering sensor 225f for detecting a direction relative to the vehicle of the actual steering mechanism of the vehicle 100 may also be a part of the vehicle interface 224. The steering sensor 225f determines the angle of the steering mechanism and provides vehicle steering information to the central processing unit or controller 212. Thus, the steering sensor 225f provides the actual steering angle of steering mechanism for the vehicle 100.

A pedal sensor 225g that detects the distance displacement of a pedal of the vehicle may also be a part of the vehicle interface 224. The pedal sensor 225g can be a part of an electronic accelerator system that indicates how much the vehicle 100 should accelerate based upon the detected displacement distance of a pedal operated by a user. The pedal senor 225g can provide the distance displacement of an accelerator pedal to the central processing unit or controller 212 through the vehicle interface 224 that occurs when a user depresses the accelerator pedal of the vehicle 100.

A wheel sensor 225h that detects the angle of revolution of the steering wheel for the vehicle may also be a part of the vehicle interface 224. The wheel sensor 225h can be a part of an electronic steering system that steers the vehicle 100 with an electro-mechanical steering mechanism. The wheel senor 225h can provides the angle of revolution of a steering wheel to the to the central processing unit or controller 212 through the vehicle interface 224 that occurs when a user turns the steering wheel of the vehicle 100.

A navigation session 299 of the telematics terminal 200 can generate the path finding information, based on the map data and current position information on the vehicle, and notifies the user of the generated path finding information. The navigation session 299 enables the telematics terminal 200 to displays the driving path on the map data. When a position of the vehicle 100 is within a predetermined distance, the navigation session 299 can automatically establishes a wireless connection to another terminal (for example, a vehicle navigation apparatus) mounted in a neighboring vehicle and/or a mobile communication terminal being carried by a neighboring pedestrian over a wireless network (for example, a short-distance wireless communication network) that is set up for wireless communication. Thus, the navigation session 299 can receive positional information on the neighboring vehicle from the terminal mounted in the neighboring vehicle and/or receive positional information on the neighboring pedestrian from the mobile communication terminal being carried by the neighboring pedestrian.

When a driver switches from an automatic driving mode of the vehicle directly to a manual driving model, a car accident may occur due to the poor ability of the driver to operate a steering wheel or the driver not maintaining a consistency in speed immediately after switching over. Therefore, the apparatus and the method for are described in which, when a user input is received that requests the switching of the automatic driving mode of the vehicle to the manual driving mode, after the driver is familiar with the driving direction of the vehicle and the current driving speed, the automatic driving mode of the vehicle is switched to the manual driving mode, thereby enabling the driver to safely drive a vehicle in the switch over to the manual driving mode.

An apparatus for switching between the vehicle driving modes and a method of switching between the vehicle driving modes will be described below referring to FIGS. 4A to 5. In the apparatus and the method of embodiments of the invention, a user input for switching of the automatic driving mode of the vehicle to the manual driving mode is received if a virtual speed based upon a distance displacement of an accelerator pedal for a vehicle is the same as or similar to a current speed of the vehicle, the automatic driving mode of the vehicle is switched to the manual driving mode, thereby enabling the driver to safely takeover driving of the vehicle in the manual driving mode. The apparatus for switching between the vehicle driving modes and the method of switching between the vehicle driving modes according to the embodiment of the present invention can be applied to an automatic driving system (ADS) in the related art and the telematics terminal 200 (or a head up display (HUD) and an instrument panel (a cluster)).

Figure 4A:
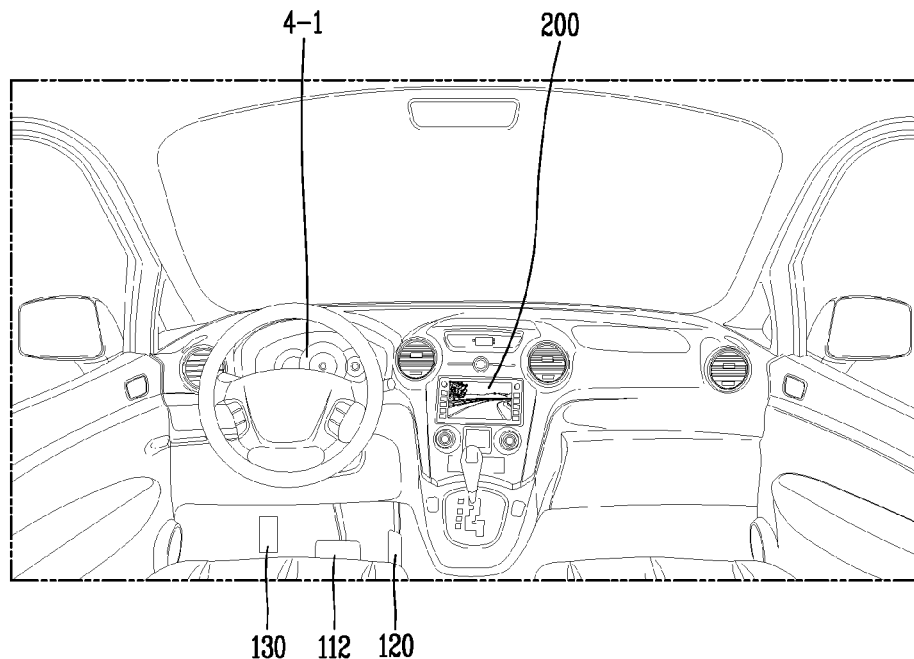
FIGS. 4A to 4D are diagrams illustrating a virtual speed according to a distance displacement of an accelerator pedal (an electronic accelerator) for a vehicle.
Figure 4B:
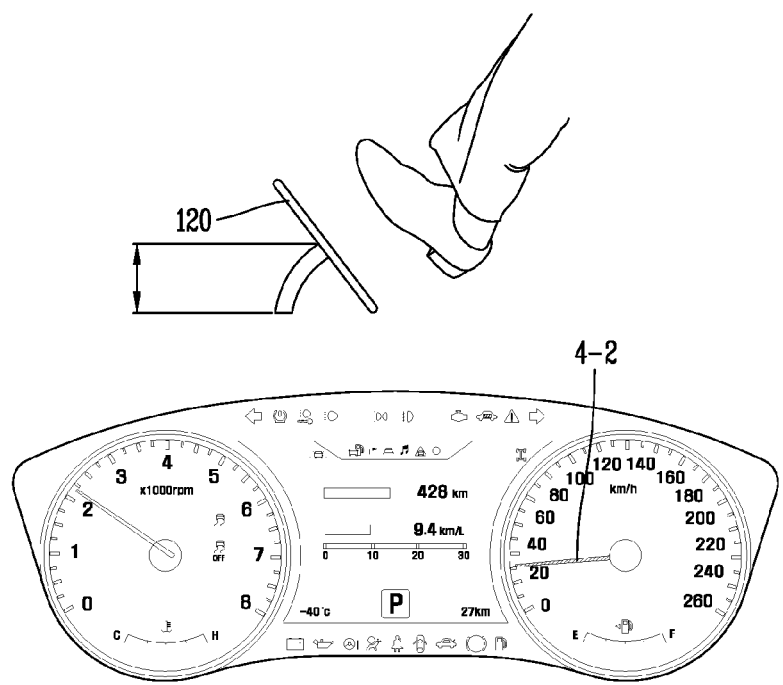

FIGS. 4A to 4D are diagrams illustrating the virtual speed according a distance displacement of an accelerator pedal (an electronic accelerator) for a vehicle. FIG. 4A is a diagram illustrating an instrument panel 4-1 in a vehicle along with accelerator 120 and a vehicle foot rest 130 that are installed with the brake pedal 112 therebetween. The instrument panel 4-1 includes a portion on which the number of revolutions of an engine of a vehicle and a second portion on which a speed of the vehicle is displayed. The instrument panel 4-1 may further include a third portion on which a steering angle of the vehicle is displayed. Further, the instrument panel 4-1 includes at least one, among a liquid crystal display, a thin film transistor-liquid crystal display, an organic light-emitting diode, a flexible display, a 3D display. FIG. 4B shows an instrument panel together with an undepressed accelerator pedal 120.

As illustrated in FIGS. 4A to 4B, an ADS controls the vehicle in such a manner that the vehicle automatically drives in the automatic driving mode of the vehicle. A current speed of the vehicle based on the number of revolutions of a wheel of the vehicle, or the number of revolutions of an engine of the vehicle, is displayed using a first indicator 4-2, such as a number or a driving speed pointer that indicates the detected current speed, on the instrument panel 4-1 (or a display unit 201 of the telematics terminal 200).

The instrument panel 4-1 can include a sensor (a touch sensor) that detects a touch operation. The touch sensor, for example, takes the form of a touch film, a touch sheet, a touch pad, or the like. In addition, the touch sensor is configured in such a manner as to convert a pressure applied to a specific portion of the instrument panel 4-1 (or display unit 201 of the telematics terminal 200), a change in electrostatic capacitance occurring in a specific portion of the instrument panel 4-1 (or display unit 201 of the telematics terminal 200), or the like into an electrical signal. The touch sensor is configured in such a manner that it detects not only a touch position and a touch area, but also a touch pressure.

Figure 5:
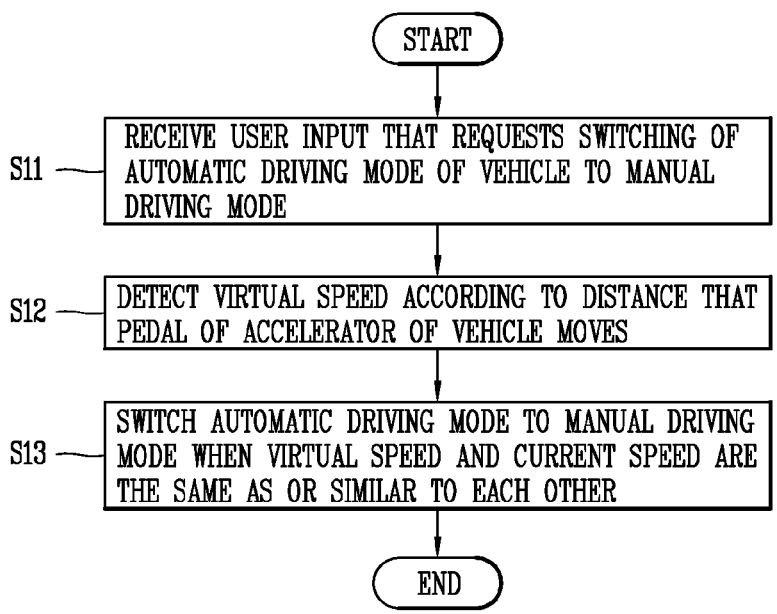
FIG. 5 is a flowchart illustrating the method of switching between the driving modes of the vehicle according to an embodiment of the present invention.

FIG. 5 is a flowchart illustrating the method of switching between the vehicle driving modes according to an embodiment of the present invention. A user input (for example, a user sound input, a button touch input, or the like) that requests the switching of the automatic driving mode of the vehicle to the manual driving mode is provided while the vehicle is driving in the automatic driving mode of the vehicle, through an input unit (a microphone, a touch sensor, or the like) (S11).

When the user input (for example, the user sound input, the button touch input, or the like) is received that requests the switching of the automatic driving mode to the manual driving mode (S11), a virtual speed based upon the current displacement distance of the accelerator pedal 120 or the distance that the accelerator pedal 120 has moved is determined (S12). For example, when the user input is received that requests the switching of the automatic driving mode to the manual driving mode, in a state where the automatic driving mode is maintained without immediately switching the automatic driving mode to the manual driving mode, the current displacement distance that the pedal of the accelerator 120 has been moved is detected from the pedal sensor 225g and a virtual speed is determined by the controller 212. More specifically, while still in the automatic driving mode and a user input is received that requests the switching of the automatic driving mode of the vehicle to the manual driving mode, the virtual speed can be determined by the controller 212 based upon the displacement distance from the pedal sensor 225g in relation to a pre-set a speed table in memory 213 as a result of a user depressing the accelerator pedal 120.

The virtual speed corresponding to the current distance displacement of the accelerator pedal 120 can be ascertained through methods other than a pre-set speed table, such as direct scaling method. The virtual speed may not be the same as the current speed that the vehicle is going while controlled in the automatic driving mode. Even though the driver may be depressing the accelerator pedal 120 of the vehicle while in the automatic driving mode, such actions will not have any influence on the current speed if in automatic driving mode and user input to switch to manual mode has not been received. Virtual speed is a speed at which the vehicle should be actually going according to the current distance displacement of the accelerator petal 120 if the vehicle was not in automatic driving mode.

Figure 4C:
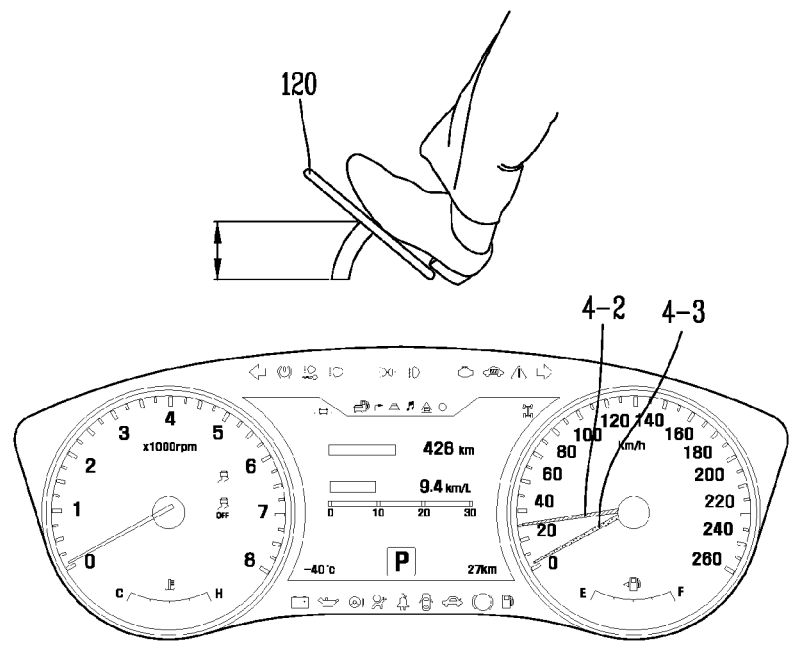

As illustrated in FIG. 4C, a second indicator 4-3 is displayed, such as a number or a driving speed pointer, that indicates the detected virtual speed, on the instrument panel (or the display unit 201 of the telematics terminal 200) 4-1. For example, when the user input is received that requests the switching of the automatic driving mode to the manual driving mode, in the state where the automatic driving mode is maintained without immediately switching the automatic driving mode to the manual driving mode, the virtual speed according to the current displacement distance of the accelerator pedal 120 is displayed as a second indicator 4-3 on the instrument panel 4-1. Both the first and second indicators 4-2 and 4-3 can be displayed on the second portion indicating the speed of the vehicle.

Figure 4D:
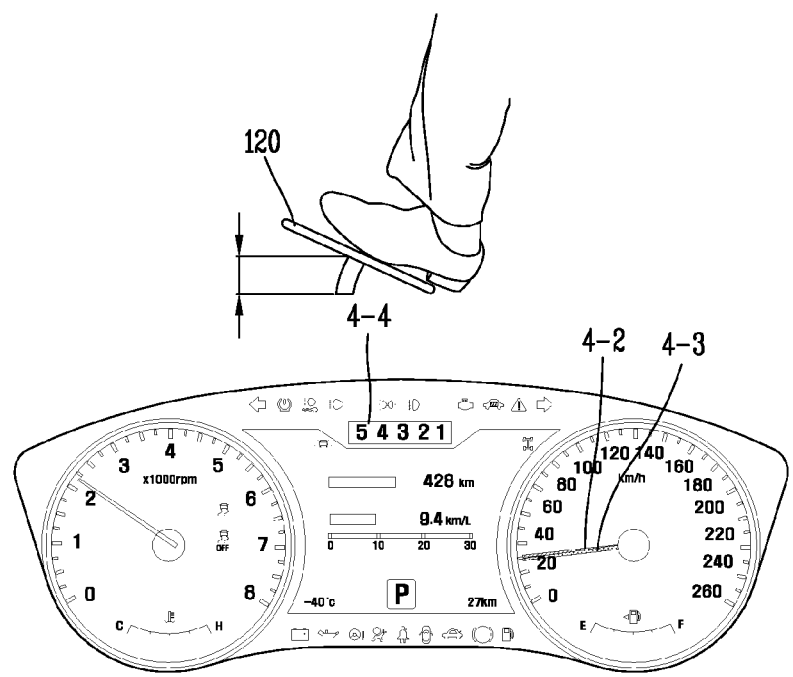

As illustrated in FIG. 4D, after receiving the user input requesting the switching of the automatic driving mode to the manual driving mode and when the virtual speed is the same as or similar to the current speed as a result of depressing the accelerator pedal 120, switching from the automatic driving mode to the manual driving mode can occur (S13). At the time the virtual speed is the same as or similar to the current speed, the controller 212 determines whether or not the virtual speed is being maintained the same as or similar to the current speed for a pre-set reference time (for example, three to five seconds). When it is determined that the virtual speed is maintained to be the same as or similar to the current speed for the pre-set reference time (for example, three to five seconds), a switch from automatic driving mode to the manual driving mode occurs. The pre-set reference time (for example, three to five seconds) is not limited, and may be changed by the user or a designer.

Upon determination by the controller 212 that the virtual speed is the same or similar to the current speed, or when the virtual speed is being maintained as the same as or similar to the current speed for the pre-set reference time (for example, three to five seconds), a pre-set countdown time (for example, five to ten seconds) 4-4 that will elapse before the automatic driving mode is switched to the manual driving mode, on the instrument panel (or the display unit 201 of the telematics terminal 200) 4-1. The pre-set countdown time (for example, five to ten seconds) 4-4 counts down. When the pre-set countdown time 4-4 (for example, five to ten seconds) elapses, the automatic driving mode is turned off such that manual driving mode occurs. The countdown time is not limited to a specific time (for example, five to ten seconds) is not limited, and may be changed by the user or the designer.

An apparatus for switching between the vehicle driving modes and a method of switching between the vehicle driving modes will be described below referring to FIG. 6 and FIGS. 7A to 7C. In the apparatus and the method, when the user input is received that requests the switching of the automatic driving mode of the vehicle to the manual driving mode, if a virtual steering wheel position compared to an actual steering wheel position of the vehicle is such that virtual steering angle is the same as or similar to a current steering angle or angle of revolution of the steering wheel of the vehicle, the automatic driving mode of the vehicle is switched to the manual driving mode, thereby enabling the driver to safely take over driving of the vehicle in the manual driving mode. The apparatus for switching between the vehicle driving modes and the method of switching between the vehicle driving modes according to an embodiment of the present invention can be applied to the automatic driving system in the related art or to the telematics terminal 200 (or a head up display (HUD) and the instrument panel (the cluster).

Figure 6:
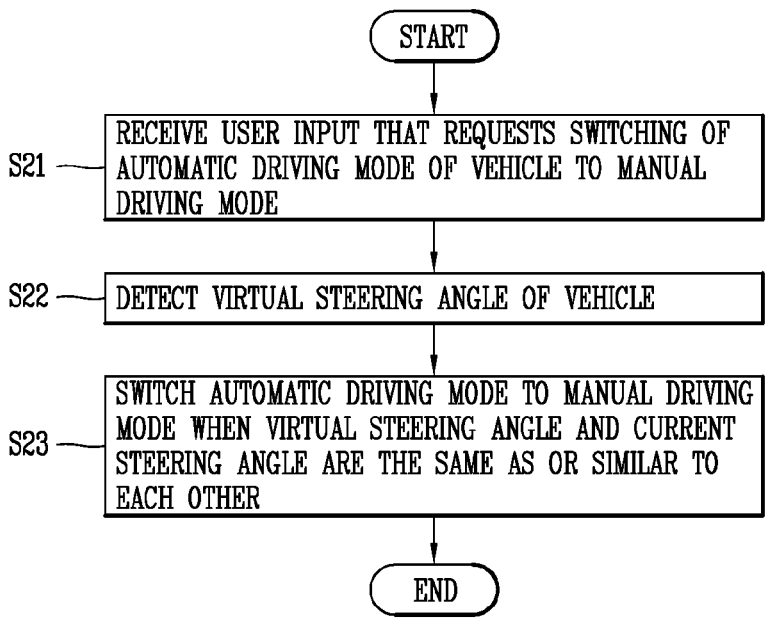
FIG. 6 is a flowchart illustrating a method of switching between the driving modes of the vehicle according to an embodiment of the present invention.
Figure 7A:
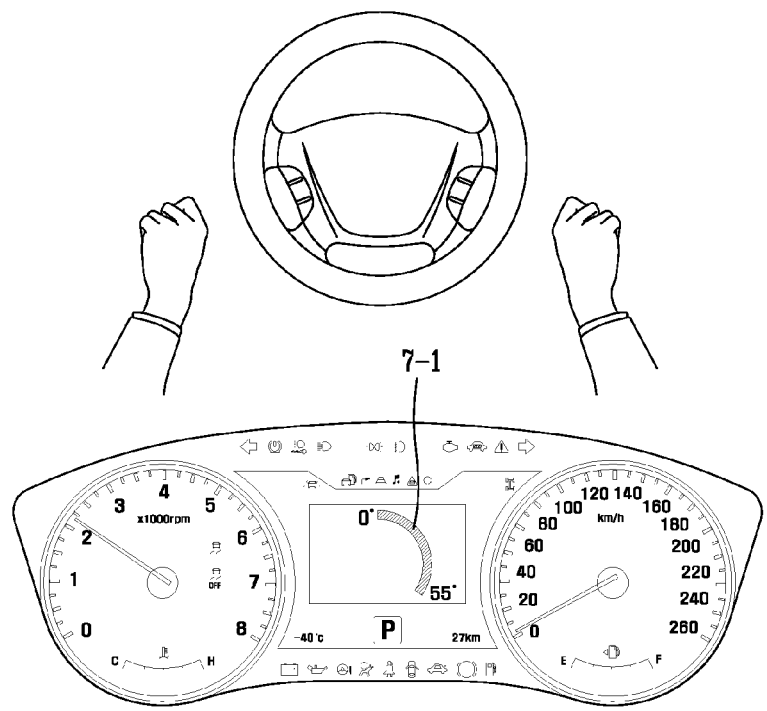
FIGS. 7A to 7C are diagrams illustrating the virtual steering angle corresponding to a current steering angle or angle of revolution of the steering wheel of the vehicle.
Figure 7B:
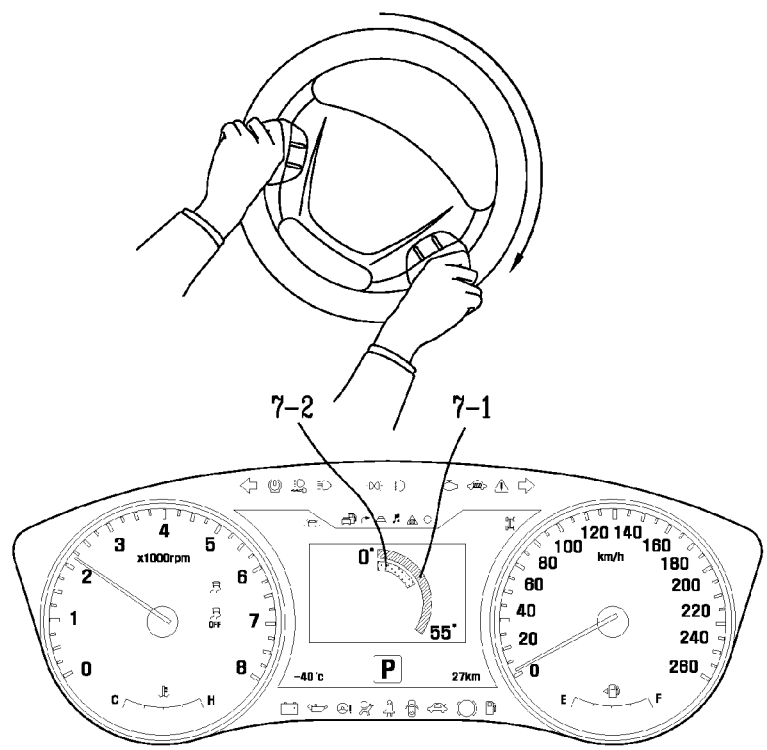
Figure 7C:
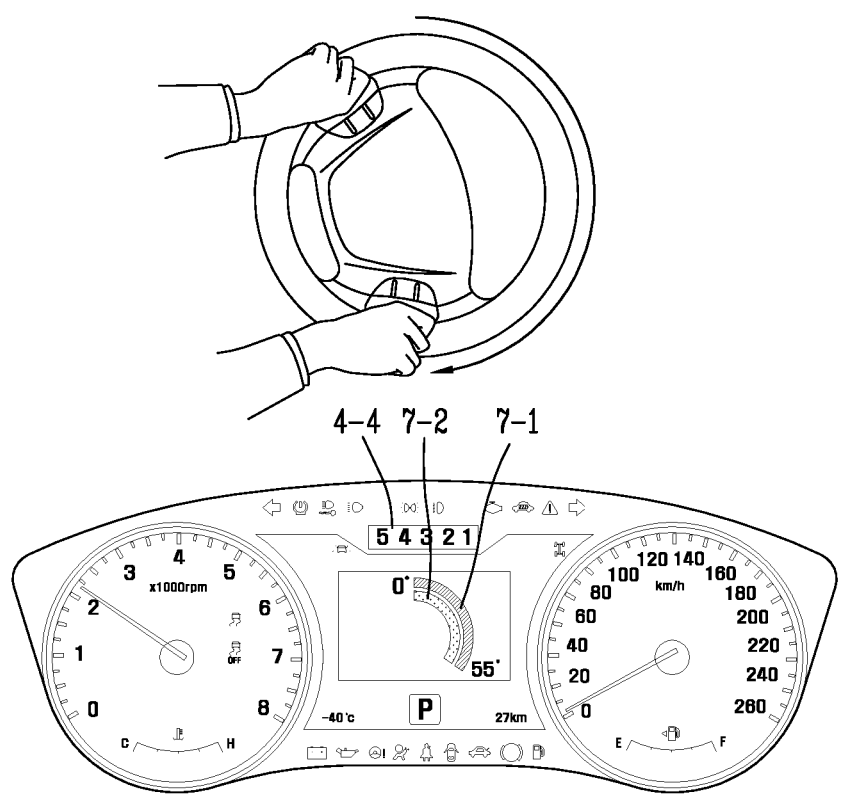

FIG. 6 is a flowchart illustrating a method of switching between the driving modes of the vehicle according to an embodiment of the present invention. FIGS. 7A to 7C are diagrams illustrating current steering angle and the virtual steering angle corresponding to an angle of revolution of the steering wheel of the vehicle. As illustrated in FIG. 7A, when the vehicle automatically drives in the automatic driving mode of the vehicle, a third indicator 7-1 is displayed, such as a number or a driving pointer that indicates the detected steering angle, on the instrument panel (or the display unit 201 of the telematics terminal 200) 4-1. More specifically, the third indicator 7-1 indicates the current steering angle of the vehicle on the third portion of the instrument panel 4-1. The steering mechanism of the vehicle may be not driven by a steering wheel in the automatic driving mode, but is driven by the steering wheel in the manual driving mode. In the automatic driving mode, the third indicator 7-1 indicates the current steering angle on the instrument panel 4-1. The current steering is obtained by the steering sensor 225*e* that detects an actual steering angle of the steering mechanism, which can be an electro-mechanical steering mechanism. A method of detecting the steering angle of the steering mechanism is known technology, and thus a detailed description of it is omitted.

The instrument panel 4-1 includes at least one, among a liquid crystal display, a thin film transistor-liquid crystal display, an organic light-emitting diode, a flexible display, a 3D display. The instrument panel 4-1 includes a sensor (a touch sensor) that detects a touch operation. The touch sensor, for example, takes the form of a touch film, a touch sheet, a touch pad, or the like. In addition, the touch sensor is configured in such a manner as to convert a pressure applied to a specific portion of the instrument panel 4-1, a change in electrostatic capacitance occurring in a specific portion of the instrument panel 4-1, or the like into an electrical signal. The touch sensor is configured in such a manner that it detects not only a touch position and a touch area, but also a touch pressure.

As shown in FIG. 6, when the user input (for example, the user sound input, the button touch input, or the like) that requests the switching of the automatic driving mode to the manual driving mode is received while the vehicle automatically drives in the automatic driving mode of the vehicle (S21), the virtual steering angle corresponding to the angle of revolution of the steering wheel of the vehicle (S22) is detected. For example, when the user input is received that requests the switching of the automatic driving mode to the manual driving mode, in the state where the automatic driving mode is maintained without immediately switching the automatic driving mode to the manual driving mode, the virtual steering angle corresponding to the actual angle of revolution of the steering wheel of the vehicle is detected. That is, while in the automatic driving mode and a user input is received that requests the switching of the automatic driving mode of the vehicle to the manual driving mode, the virtual steering angle is determined by the controller 212 based upon the actual angle of revolution for the steering wheel detected by the wheel sensor 225*h* in relation to a pre-set steering table in the memory 213 as a result of a user having turned the steering wheel.

The virtual steering angle corresponding to the actual revolution of angle of the steering wheel can be ascertained through methods other than a pre-set steering table, such as direct scaling method. The virtual steering angle may not be the same as the current steering angle that the vehicle is be directed toward while controlled in the automatic driving mode. Even though the driver may be turning the steering wheel of the vehicle while in the automatic driving mode, such actions will not have any influence on the current steering if in automatic driving mode and a user input to switch to manual mode has not been received. Virtual steering is a direction at which the vehicle should be going according to the actual angle of revolution for the steering wheel if the vehicle was not in automatic driving mode.

As illustrated in FIG. 7B, a fourth indicator 7-4 indicates the detected virtual steering angle on the instrument panel (or the display unit 201 of the telematics terminal 200) 4-1. For example, when the user input is received that requests the switching of the automatic driving mode to the manual driving mode, in the state where the automatic driving mode is maintained without immediately switching the automatic driving mode to the manual driving mode, the virtual steering angle corresponding to the actual angle of revolution for the steering wheel of the vehicle is detected using the wheel sensor 225*h*.

As illustrated in FIG. 7C, when it is determined that the virtual steering angle is the same as or similar to the current steering angle, switching from automatic driving mode to manual driving mode can occur (S23). When the controller 212 determines that the virtual steering angle is the same as or similar to the current steering angle, a further determination can be made as to whether or not the virtual steering angle is being maintained similar to or the same as the current steering angle for a pre-set steering reference time (for example, three to five seconds). When the virtual steering angle is maintained to be the same as or similar to the current steering angle for the pre-set steering reference time (for example, three to five seconds), the controller 212 may switch the automatic driving mode to the manual driving mode. The pre-set steering reference time is not limited to a specific time (for example, three to five seconds) and may be changed by the user or a designer.

Upon determination that the virtual steering angle is the same or similar to the current steering angle, or when the virtual steering angle is being maintained similar to or the same as the current steering angle for the pre-set steering reference time (for example, three to five seconds), the controller displays a pre-set switchover time (for example, five to ten seconds) 4-4 that will elapse before the automatic driving mode is switched to the manual driving mode, on the instrument panel (or the display unit 201 of the telematics terminal 200) 4-1. The controller 212 counts down the pre-set switchover time (for example, five to ten seconds) 4-4. When the pre-set time 4-4 (for example, five to ten seconds) elapses, the controller may switch the automatic driving mode to the manual driving mode. The pre-set switchover time is not limited to a specific time (for example, five to ten seconds) is not limited, and may be changed by the user or the designer.

In another embodiment, when the virtual speed is the same as or similar to the current speed and the virtual steering angle is the same as or similar to the current steering angle, the controller may then switch the automatic driving mode to the manual driving mode.

An apparatus for switching between the vehicle driving modes and a method of switching between the vehicle driving modes will be described below referring to FIG. 8. In the apparatus and the method, when the user input is received that requests the switching of the automatic driving mode of the vehicle to the manual driving mode and an object (objects) is recognized by an advanced driving assist system (ADAS) that is in the direction of a user's gaze recognized by a driver state monitoring (DSM) system, the automatic driving mode of the vehicle is switched to the manual driving mode, thereby enabling the driver to safely switch to driving the vehicle in the manual driving mode.

The apparatus for switching between the vehicle driving modes and the method of switching between the vehicle driving modes according to the embodiment of the present invention can be applied to the automatic driving system in the related art, the telematics terminal 200 (or the head up display (HUD)) and the instrument panel (the cluster).

FIG. 8 is a flowchart illustrating a method of switching between the vehicle driving modes according to another embodiment of the present invention. A user input (for example, the user sound input, the button touch input, or the like) that requests the switching of the automatic driving mode of the vehicle to the manual driving mode while the vehicle automatically drives in the automatic driving mode of the vehicle (S31) is received.

When the user input (for example, the user sound input, the button touch input, or the like) is received that requests the request of the switching of the automatic driving mode to the manual driving mode, gaze information on the direction of the user's gaze is detected through a driver state monitoring (DSM) system over a wired or wireless network (S32). The driver state monitoring (DSM) system, which detects blinking eyes of the driver, the direction of the driver's gaze, and the like, is a known technology, and thus a description of it is omitted.

When the user input (for example, the user sound input, the button touch input, or the like) is received that requests the switching of the automatic driving mode to the manual driving mode, the controller receives (detects) object information on the object(s) recognized by the advanced driving assist system (ADAS) (S33). For example, the object information can be with regard to neighboring vehicles, pedestrians, obstacles, lanes, traffic signals, and the like, which are recognized by the advanced driving assist system (ADAS) are received from the advanced driving assist system (ADAS) over a wired or wireless network. The advanced driving assist system (ADAS) is a known technology, and thus a description of it is omitted.

The controller determines whether or not the object(s) recognized by the advanced driving assist system (ADAS) is in the direction of the driver's gaze as detected by the DSM system, and, when it is determined that the object(s) recognized by the advanced driving assist system (ADAS) is in the direction of the driver's gaze, switches the automatic driving mode of the vehicle to the manual driving mode (S34). When the virtual speed is the same as or similar to the current speed, the virtual steering angle is the same as or similar to the current steering angle, and the object(s) recognized by the advanced driving assist system (ADAS) is in the detected direction of the driver's gaze, the controller may switch the automatic driving mode to the manual driving mode.

As described above, in the apparatus for switching to manual driving mode from automatic driving mode and the method of switching to manual driving mode from automatic driving mode according to the embodiments of the present invention, when the virtual speed is the same as or similar to the current speed, the automatic driving mode is switched to the manual driving mode, thereby enabling the driver to safely switch to the manual driving mode.

In the apparatus for switching from automatic driving mode to manual driving modes and the method of switching from automatic driving mode to manual driving modes according to the embodiments of the present invention, when the virtual steering angle is the same as or similar to the current steering angle, the automatic driving mode is switched to the manual driving mode, thereby enabling the driver to safely switch to driving in the manual driving mode.

In the apparatus for switching between the vehicle driving modes and the method of switching between the vehicle driving modes according to embodiments of the present invention, when the object(s) recognized by the advanced driving assist system (ADAS) is in the direction of the driver's gaze as detected by the driver state monitoring (DSM) system, the automatic driving mode is switched to the manual driving mode, thereby enabling the driver to safely switch to driving in the manual driving mode.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. An apparatus for controlling a vehicle, comprising:
   a sensor configured to determine a current vehicle driving information associated with the vehicle; and
   a controller configured to determine a virtual vehicle driving information associated with the vehicle if the vehicle is in an automatic driving mode, and to switch the automatic driving mode to a manual driving mode when the current vehicle driving information is matched to the virtual vehicle driving information.

2. A method for controlling a vehicle, comprising:
   determining a current vehicle driving information associated with the vehicle;
   determining a virtual vehicle driving information associated with the vehicle if the vehicle is in an automatic driving mode; and switching the automatic driving mode to a manual driving mode when the current vehicle driving information is matched to the virtual vehicle driving information.

3. The method of claim 2, wherein the current vehicle driving information is a current steering angle of a steering mechanism for the vehicle, and wherein the switching the automatic driving mode to a manual driving mode includes:

determining a virtual steering angle corresponding to an angle of revolution of a steering wheel of the vehicle if the vehicle is in the automatic driving mode; and switching the automatic driving mode to the manual driving mode when the virtual steering angle is matched to the current steering angle of a steering mechanism for the vehicle.

4. The method of claim 2, wherein the current vehicle driving information is a current speed of the vehicle, and wherein the switching the automatic driving mode to a manual driving mode includes:

determining a virtual speed according to a current distance displacement of an accelerator pedal of the vehicle if the vehicle is in an automatic driving mode; and switching the automatic driving mode to the manual driving mode when the virtual speed is matched to the current speed of the vehicle.

5. The method of claim 2, wherein the switching of the automatic driving mode to the manual driving mode includes:

determining whether an object recognized by an advanced driving assist system (ADAS) is in a direction of a driver's gaze, which is recognized by a driver state monitoring (DSM) system; and switching the automatic driving mode to the manual driving mode when the object is in the direction of the user's gaze.

* * * * *